(12) United States Patent
Shioji et al.

(10) Patent No.: US 6,865,967 B2
(45) Date of Patent: Mar. 15, 2005

(54) SHIFT LEVER DEVICE

(75) Inventors: Norihito Shioji, Shizuoka (JP); Mitsuo Narazaki, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 90 days.

(21) Appl. No.: 10/274,108

(22) Filed: Oct. 21, 2002

(65) Prior Publication Data

US 2003/0074999 A1 Apr. 24, 2003

(30) Foreign Application Priority Data

Oct. 22, 2001 (JP) ........................................ 2001-323452

(51) Int. Cl.⁷ .............................................. G05G 5/00
(52) U.S. Cl. ................. 74/473.23; 74/473.18; 74/473.25
(58) Field of Search ................ 74/473.15, 473.18, 74/473.21, 473.22, 473.23, 473.24, 473.25, 473.33

(56) References Cited

U.S. PATENT DOCUMENTS

| | | | | |
|---|---|---|---|---|
| 5,588,330 A | * | 12/1996 | Kataumi et al. | 74/483 R |
| 5,980,423 A | * | 11/1999 | Suzuki et al. | 477/99 |
| 6,009,769 A | * | 1/2000 | Ikegami | 74/473.23 |
| 6,148,686 A | * | 11/2000 | Kataumi | 74/473.18 |

FOREIGN PATENT DOCUMENTS

JP    11-151946 A    6/1999

* cited by examiner

*Primary Examiner*—David A. Bucci
*Assistant Examiner*—Timothy McAnulty
(74) *Attorney, Agent, or Firm*—Foley & Lardner LLP

(57) ABSTRACT

A select member has a stopper arm, is pivotally connected to a case and is pivotal about a first axis substantially perpendicular to a longitudinal axis of the case. A shift lever is connected to the select member and pivotal about a second axis substantially in parallel with the longitudinal axis and has a portion that passes through a gate slot. A lock lever is pivotal into the window to block gthe stopper arm. An actuating mechanism permits the lock lever to selectively assume a position wherein the lock lever blocks movement of the stopper arm.

15 Claims, 8 Drawing Sheets

SHIFT LEVER DEVICE

BACKGROUND OF THE INVENTION

1. Field of the Invention

The present invention relates in general to shift lever devices of an automotive automatic transmission, and more particularly to the shift lever devices of a type that provides P-position with a lock function and N-position with a R-position shift inhibiting function.

2. Description of the Related Art

Hitherto, in automotive automatic transmissions, there have been proposed various types of shift lever devices. One of them is of a so-called gate type wherein a shift lever is permitted to move along a zigzag path for selecting a desired gear position. In order to suppress unwilled shifting of the shift lever, for example, unwilled movement from N-position to R-position of the shift lever, the shift lever devices of such gate type have a shift inhibiting mechanism. One of them is disclosed in Laid-open Japanese Patent Application (Tokkaihei) 11-151946. The shift inhibiting mechanism of this publication employs a lock lever that is arranged to abut against a stopper member of the shift lever when a shift inhibiting function is needed.

However, due to its inherent construction, even the shift lever device of the publication has failed to exhibit a satisfied performance. That is, it is difficult to provide the device with a robust construction.

SUMMARY OF THE INVENTION

It is therefore an object of the present invention to provide a shift lever device which is superior to the shift lever device of the above-mentioned publication.

According to the present invention, there is provided a shift lever device of gate type, having a shift inhibiting mechanism by which, when operated, unwilled N→R shifting and/or P→R shifting of a shift lever is assuredly suppressed.

According to the present invention, there is provided a shift lever device of gate type, which is robust in construction.

According to the present invention, there is provided a shift lever device which comprises a case adapted to be mounted on a vehicle, the case having a longitudinal axis and including an indicator roof panel that has a gate slot formed therethrough; a window formed in the case, the window having opposed inner walls; a select member pivotally connected to the case in a manner to pivot about a first axis that extends substantially perpendicular to the longitudinal axis, the select member having a stopper arm exposed to the window; a shift lever pivotally connected to the select member in a manner to pivot about a second axis that extends substantially in parallel with the longitudinal axis, the shift lever having a portion that passes through the gate slot; a lock lever pivotally connected to the case to be projectable into the window to block a traveling path of the stopper arm of the select member; a load supporting structure that permits the lock lever to move to and abut against either one of the opposed inner walls of the window when a given force is applied to the lock lever by the stopper arm of the select member; and an actuating mechanism that permits the lock lever to selectively assume a first position wherein the lock lever is projected into the window blocking the traveling path of the stopper arm and a second position wherein the lock lever is kept away from the window opening the traveling path.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

For ease of understanding, various directional terms, such as, right, left, upper, lower, rightward, etc., are included in the description. However, such terms are to be understood with respect to only a drawing or drawings on which the corresponding part or portion is shown.

Figure 5:
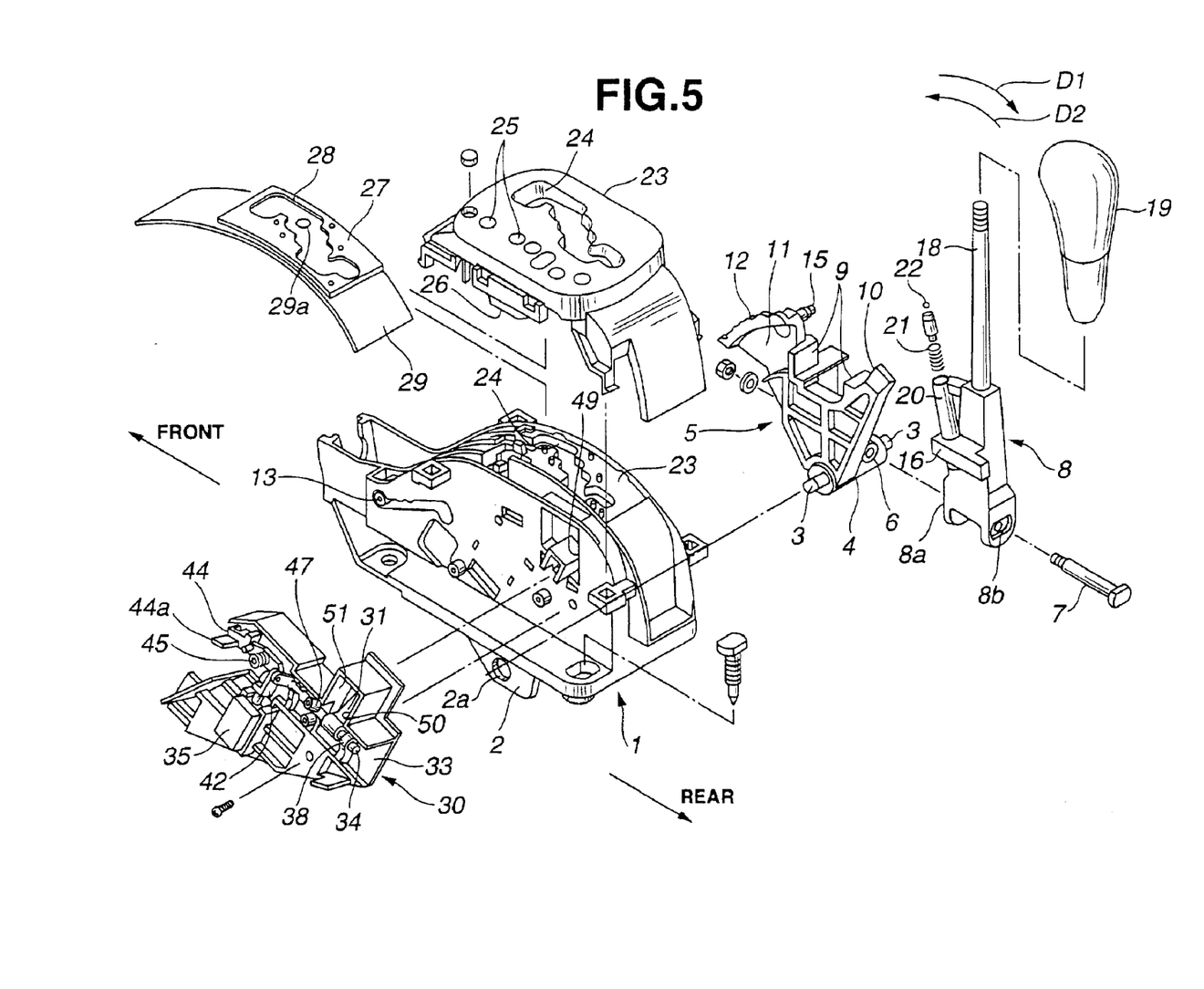
FIG. 5 is an exploded view of the shift lever device of the present invention.

Referring to the drawings, particularly FIG. 5, there is shown a shift lever device of the present invention.

Denoted by numeral 1 is a case made of a reinforced plastic, which is tightly mounted on a given portion of a vehicle body. The case 1 is formed at a bottom thereof with two parallel brackets 2 each extending in a fore-and-aft direction of the vehicle body. The brackets 2 are formed with respective circular openings 2a which are aligned. The aligned circular openings 2a rotatably receive therein axially opposed ends 3 of a shaft 4 of a select member 5. Thus, the select member 5 pivots forward and rearward about an axis of the aligned circular openings 2a, that is, forward and rearward relative to the vehicle body. That is, the select member 5 pivots about a first axis defined by the shaft 4, which is substantially perpendicular to a longitudinal axis of the case 1. The select member 5 is made of a reinforced plastic that is different from that of the case 1.

As shown in FIG. 5, the select member 5 is formed, at a portion on the shaft 4, with a shaft supporting portion 6 which extends in a fore-and-aft direction of the vehicle body. To the shaft supporting portion 6, there is pivotally connected a shift lever 8 through a shaft 7. Thus, the shift lever 8 pivots rightward and leftward with respect to the vehicle body. That is, the shift lever 8 pivots about a second axis relative to the select member 5, which is substantially in parallel with the longitudinal axis of the case 1.

As is seen from FIGS. 2 and 3, below the bottom of the case 1, there is arranged a mounting plate 52 which has a rubber cover 53 engaged with the bottom of the case 1.

Referring back to FIG. 5, the select member 5 is formed with a guide groove 9 with which a slider boss 16 of the shift lever 8 is slidably engaged. The select member 5 is formed at a rear side bank of the guide groove 9 with a stopper arm 10 and at a front side bank of the guide groove 9 with a sector arm 11. The stopper arm 10 is formed with a tapered leading end. The sector arm 11 is formed with a notched peripheral edge 12 which is shaped to be concentric with the shaft 4.

Figure 3:
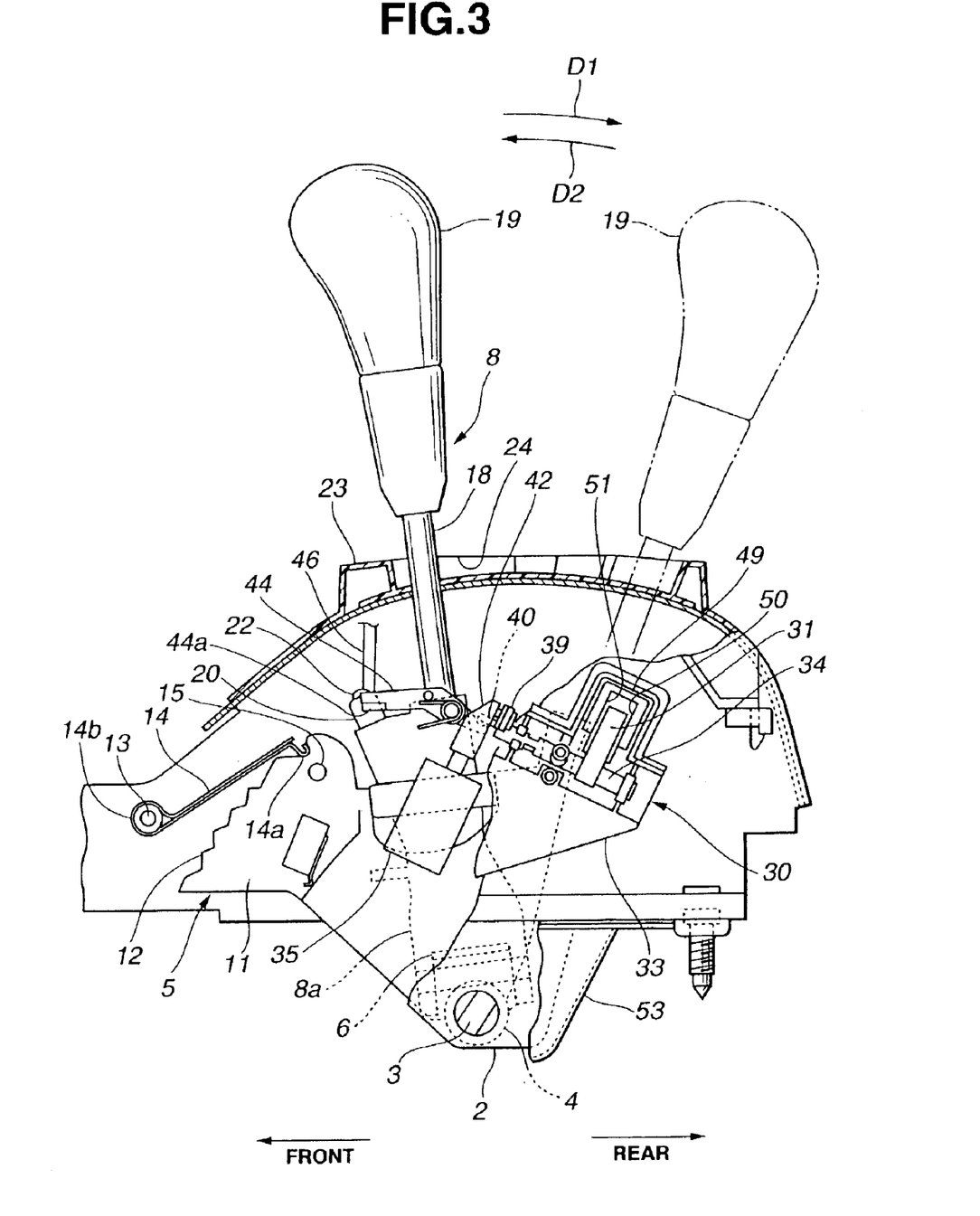
FIG. 3 is a view similar to FIG. 2, but showing a shift lever installed in the shift lever device of the present invention.

As is seen from FIG. 3, against the notched peripheral edge 12 of the sector arm 11, there is resiliently pressed a rounded free end 14a of a spring plate 14 whose base end 14b is tightly connected to an inside surface of the case 1 through a pin 13.

Figure 6:
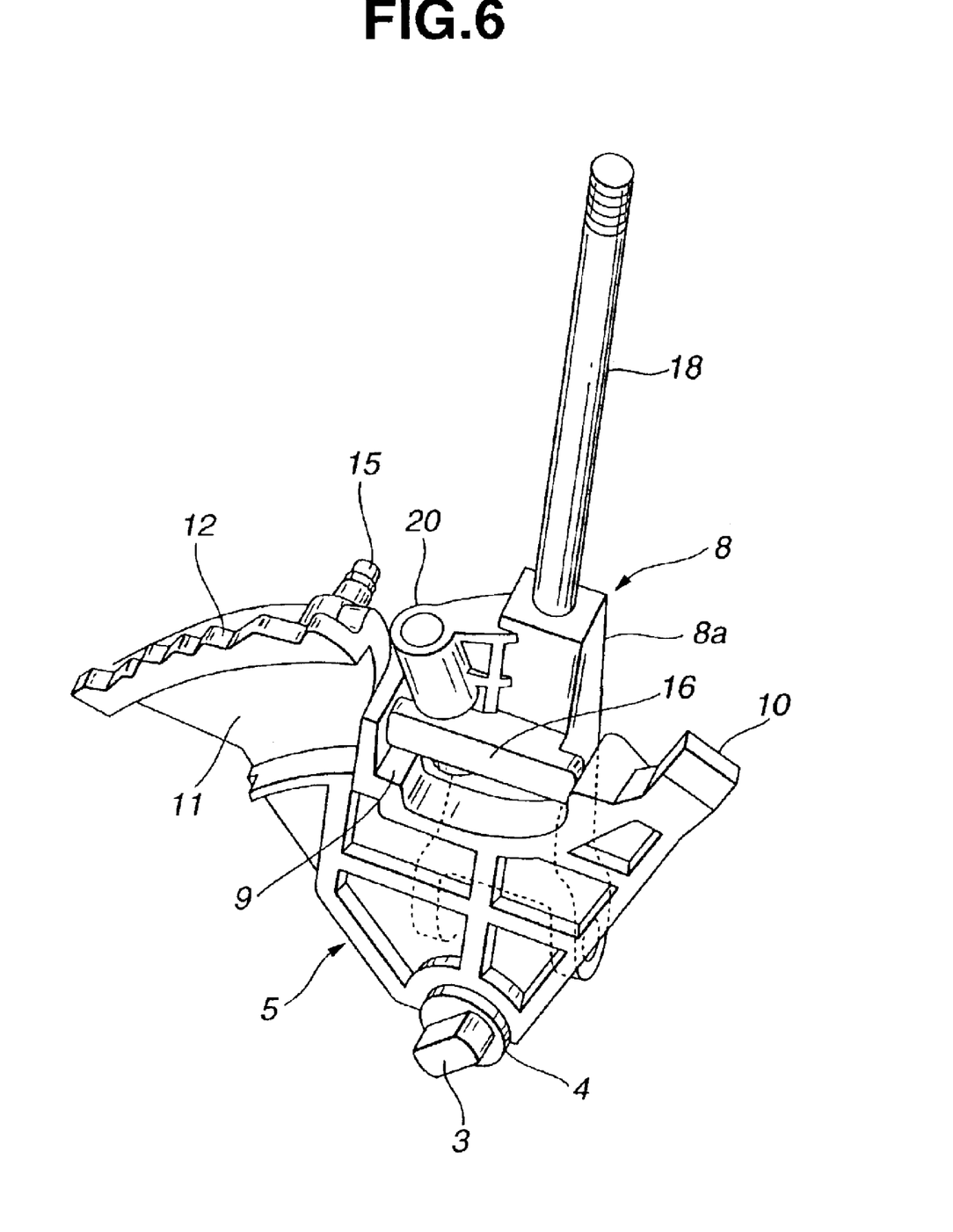
FIG. 6 is a perspective view of a portion of the shift lever device where a select member and a shift lever are installed.

As is seen from FIGS. 5 and 6, the sector arm 11 is formed at its right side surface with a pin 15 to which a cable (not shown) extending from an automatic transmission (not shown) is connected.

The shift lever 8 is made of a reinforced plastic and formed with a base portion 8a that has a bore 8b through which the shaft 7 passes. As shown, the slider boss 16 is integrally mounted on an upper portion of the base portion 8a. If desired, the slider boss 16 may be a separate member that is detachably connected to the shift lever 8.

As is seen from FIG. 6, upon assembly, axially ends of the slider boss 16 are constantly and slidably engaged with respective side walls of the guide groove 9 of the select member 5. A metal tube 18 has a lower end embedded in the shift lever 8.

As is seen from FIG. 5, a knob 19 is detachably connected to an upper end of the metal tube 18. The base portion 8a of the shift lever 8 is formed with an upwardly extending tubular portion 20 into which a coil spring 21 and a slide pin 22 are installed.

Figure 4:
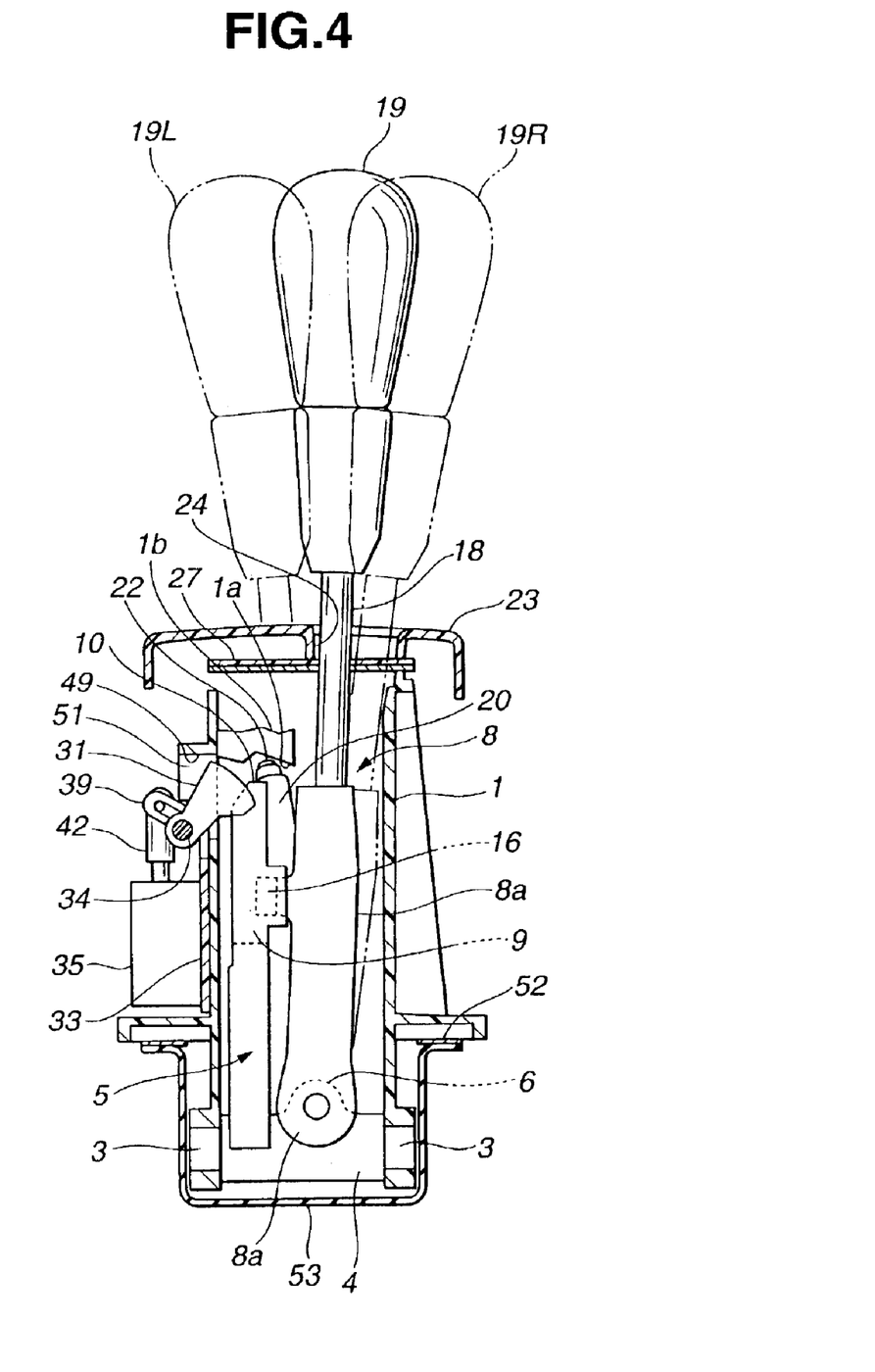
FIG. 4 is a sectional view of the shift lever device of the present invention, that is taken from a front of the device.

As shown in FIG. 4, upon assembly, the slide pin 22 is slidably pressed against an inclined groove 1a defined on a lower surface of a bracket 1b that is mounted on an upper portion of the case 1. The groove 1a extends to be concentric with the shaft 4, and as shown, the groove 1a has a width that is sloped in a lateral direction of the vehicle. Due to a biasing force produced by the coil spring 21 in the tubular portion 20 and a sliding engagement of the slide pin 22 with the inclined width of the groove 1a, the shift lever 8 is biased to take a left position 19L as viewed in FIG. 4. For the reason which will become apparent hereinafter, at a portion that corresponds to "3/D position", the groove 1a has two recesses into which the spring-biased slide pin 22 is insertable for holding the shift lever 8 at two predetermined positions. Thus, when the shift lever 8 is moved between the two positions, a detent feeling is produced and thus given to a driver who is handling the shift lever 8.

As is seen from FIGS. 1, 3, 4 and 5, the metal tube 18 of the shift lever 8 extends upward through a gate slot 24 formed in a curved indicator roof panel 23 that covers a curved upper open portion of the case 1.

Figure 1:
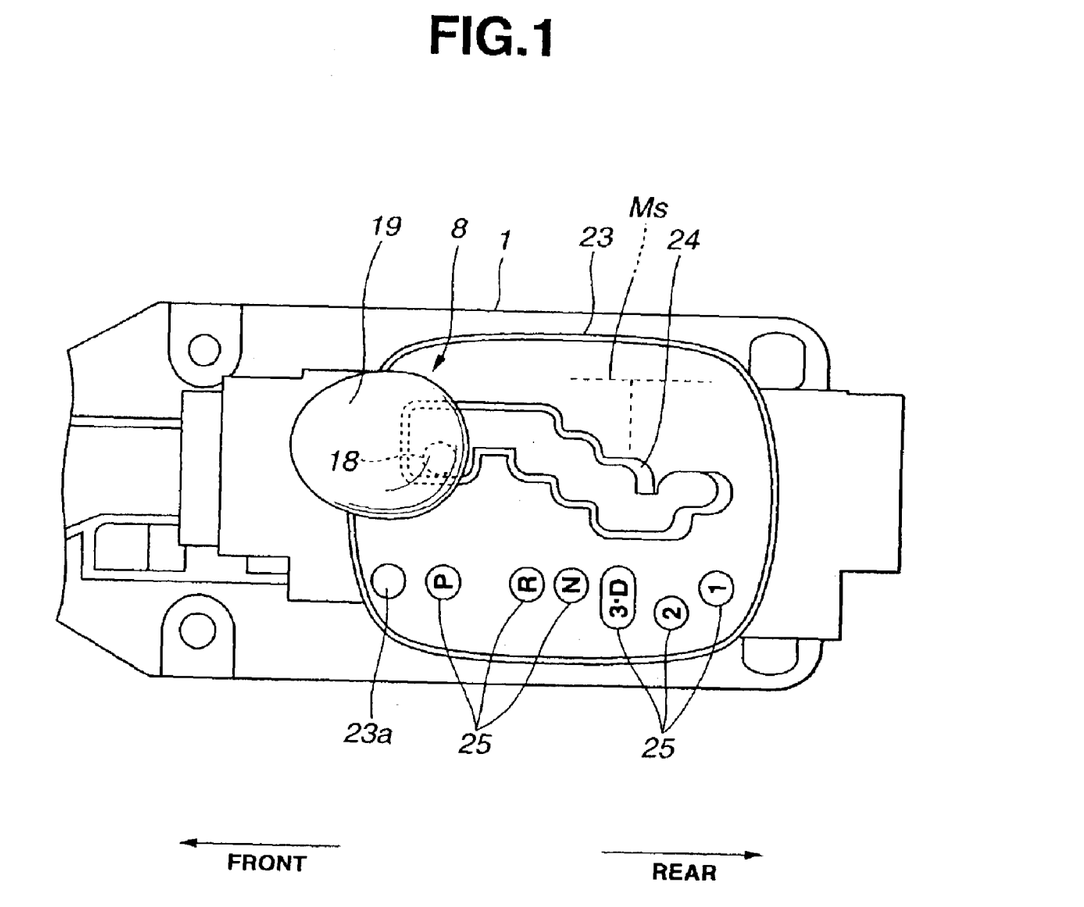
FIG. 1 is a plan view of a shift lever device of the present invention.

As is seen from FIGS. 1 and 5, the gate slot 24 has a zigzag shape including various lever hold bay portions. Beside the lever hold bay portions, corresponding indication windows 25 are provided in the indicator roof panel 23, which are for P-position, R-position, N-position, 3/D-position, 2-position and 1-position.

It is to be noted that 3/D-position includes 3-position and D-position.

As is shown in FIG. 5, below the indication windows 25 of the indicator roof panel 23, there is provided a lamp house 26 that houses therein a lamp or lamps for illuminating the windows 25 from rear side. Furthermore, below the zigzag gate slot 24 of the indicator roof panel 23, there is provided a curved guide plate 27 having a guide slot 28 that is identical in shape to the gate slot 24 of the indicator roof panel 23. Upon assembly, the two guide slots 28 and 24 are merged with each other. Beneath the guide plate 27, there is slidably disposed a shield plate 29 that has an opening 29a through which the pipe 18 passes. Thus, when the shift lever 8 moves in and along the zigzag gate slot 24, the shield plate 29 moves together with the shift lever 8.

Designated by numeral 30 is a lock unit that is mounted to a left side of the case 1 (as viewed in FIG. 5). The lock unit 30 has a pivotal lock lever 31 that is made of a reinforced plastic and engageable with the above-mentioned stopper arm 10 of the select member 5 in an after-mentioned manner.

Figure 7:
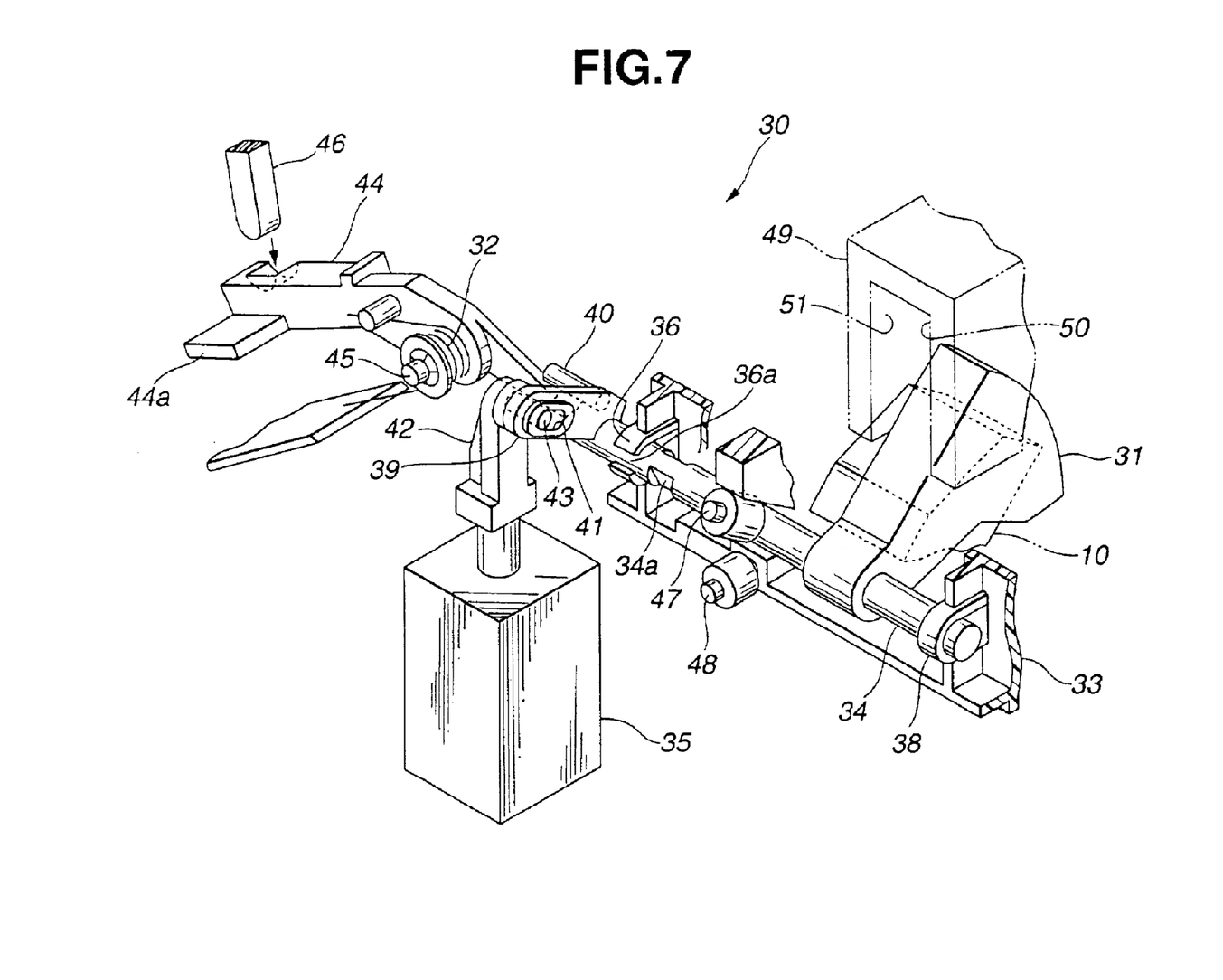
FIG. 7 is a perspective view of a portion of the shift lever device where a lock lever is installed.
Figure 8:
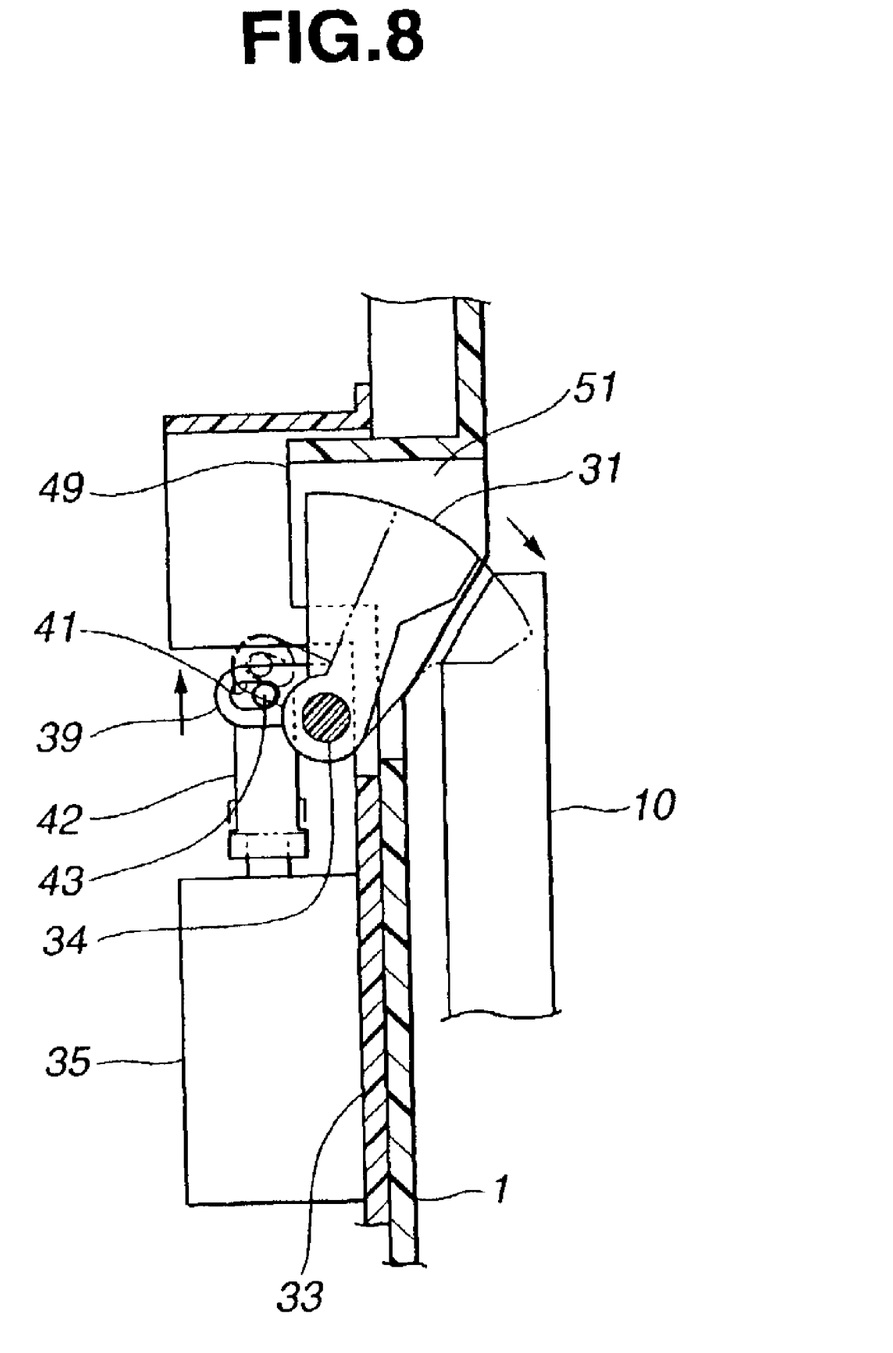
FIG. 8 is a sectional view of a portion of the shift lever device wherein the lock lever is installed.

As is seen from FIGS. 5 and 7, the lock unit 30 comprises a base plate 33 having a plurality of projections that are detachably engaged with engaging notches formed in the left side of the case 1. To the base plate 33, there is pivotally connected the lock lever 31 through a shaft 34. The shaft 34 is integral with the lock lever 31 and thus these parts 34 and 31 move together as a single unit. To the base plate 33, there is also connected an electric actuator 35 that functions to turn or pivot the shaft 34 and thus the lock lever 31.

As is best seen from FIG. 7, the lock lever 31 has a generally sectoral form and the shaft 34 extends perpendicular to a base portion of the lock lever 31. The shaft 34 to which the lock lever 31 is secured can rotate about an axis thereof and move along the axis by a certain but small distance. For this movement, the right end and left end portions of the shaft 34, as viewed in FIG. 7, are rotatably and axially held by first and second shaft holders 38 and 36 which are secured to the base plate 33 of the lock unit 30. As shown, the second shaft holder 36 is shaped like a clip including two arms whose leading ends 36a are separated by a certain distance. Near the second shaft holder 36, the shaft 34 has a thinner portion 34a. Due to provision of such thinner portion 34a, the shaft 34 can be easily put into the first and second shaft holders 38 and 36. That is, for this putting, the thinner portion 34a is put into the second shaft holder 36 through the clearance defined by the arms and the shaft 34 is axially moved to receive the right end portion thereof into the first shaft holder 38.

As shown in FIG. 7, the left end of the shaft 34 is integrally formed with a radially projected lever 39 and an axially projected cancel pin 40. The cancel pin 40 is somewhat offset with respect to the axis of the shaft 34.

As is seen from FIGS. 5 and 7, the lock lever 31 is insertable into a rectangular window 49 formed in a side wall of the case 1. Due to the axially movable arrangement of the shaft 34, positioning of the lock lever 31 relative to the window 49 can be exactly and easily made.

Referring back to FIG. 7, the lever 39 has an elongate opening 41 formed therethrough. Slidably engaged with the elongate opening 41 is a pin 43 that is provided on a work arm 42 of the electric actuator 35. The pin 43 has such a length as to keep the pivotal and slidable connection between the lever 39 and the work arm 42 even when the shaft 34 axially moves by a distance that permits movement of the lock lever 31 between opposed inner walls 50 and 51 (see FIG. 2) of the window 49 of the case 1.

As is shown in the drawing (viz., FIG. 7), near the axially projected cancel pin 40 of the shaft 34, there is placed a leading end of a cancel lever 44 that is pivotally connected to the base plate 33 through a shaft 45. A coil spring 32 is disposed about the shaft 45 to bias the cancel lever 44 in a direction to separate the leading end of the same from the cancel pin 40.

Figure 2:
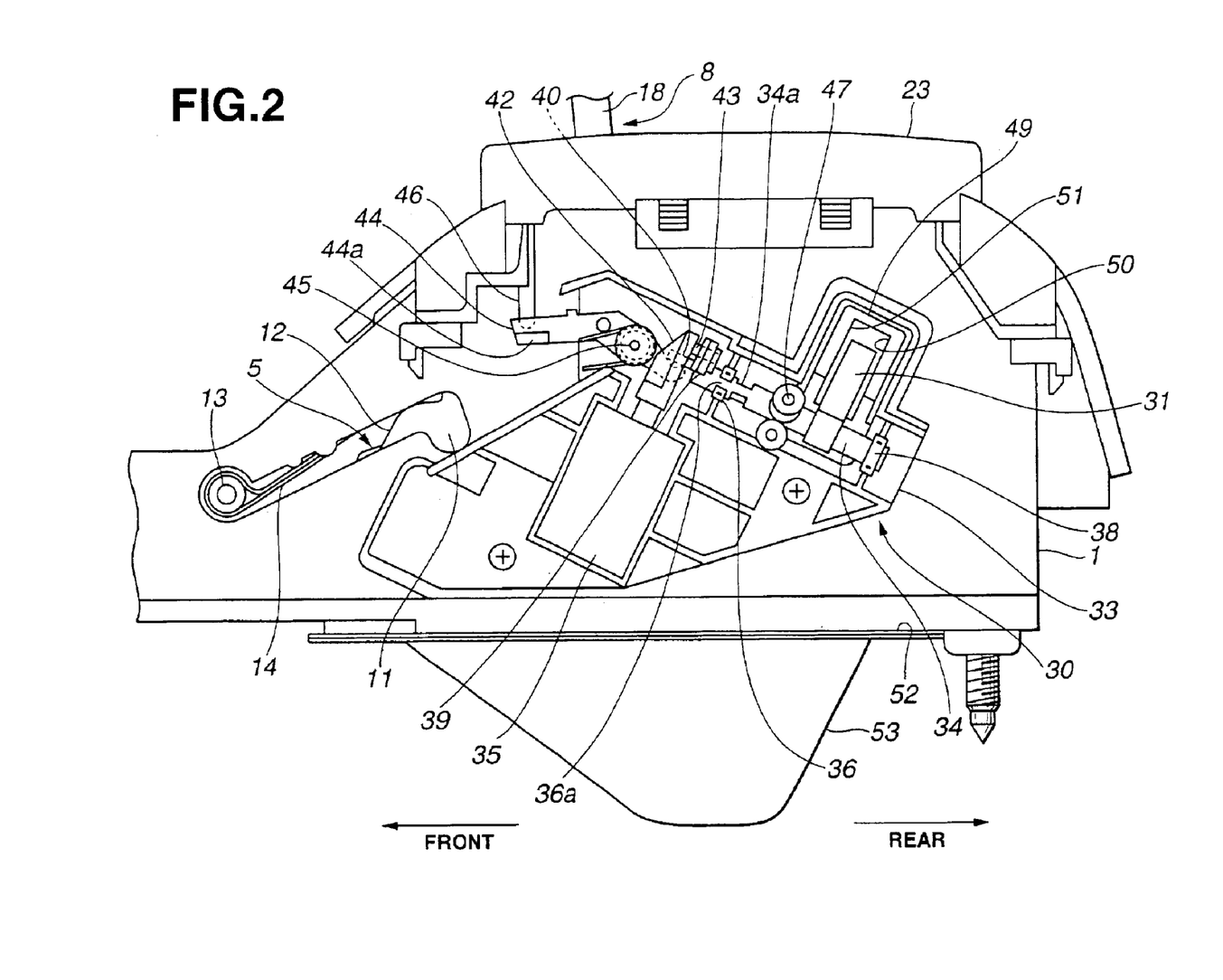
FIG. 2 is a side view of the shift lever device of the present invention with some parts removed for clarification of arrangement of parts.

The other end of the cancel lever 44 is in contact with a lower end of a cancel rod 46 that has an upper end projected into the indicator roof panel 23 (see FIG. 2). More specifically, as is seen from FIGS. 1 and 2, the cancel rod 46 is slightly projected upward through an opening formed in the indicator panel roof panel 23, which is covered with a detachable lid 23a. That is, when the lid 23a is removed from the opening, the upper end of the cancel rod 46 can be manually pressed down. With this manual operation, the cancel lever 44 pushes up the cancel pin 40 thereby to withdraw the lock lever 31 from the window 49. As will be clarified hereinafter, under this condition, the select member 5 is pivotal in a fore-and-aft direction without obstruction by the lock lever 31.

The shaft 34 has at a middle portion thereof a projection 47 which is contactable with another projection 48 provided on the base plate 33. That is, by contacting the projection 48, the projection 47 restricts the rotation of the shaft 34 about the axis of the same. The cancel lever 44 is formed with a bracket 44a that is useful when assembling of the cancel lever 44 in the lock unit 30 is made.

As is well understood from FIG. 5, the window 49 of the case 1 is so sized as to permit a pivotal movement of the lock lever 31 therein and therefrom. More specifically, as is seen from FIG. 4, the window 49 is framed and has the front and rear opposed inner walls 51 and 50 against which front and rear walls of the lock lever 31 can abut when the shaft 34 to which the lock lever 31 is fixed moves axially in a forward and rearward direction.

As may be seen from FIGS. 5 and 7, in the window 49, when the shift lever 8 is in P-position, the front wall of the lock lever 31 is in abutment with the rear wall of the stopper arm 10 thereby suppressing movement of the shift lever 8 toward R-position. While, when the shift lever 8 is in N-position, 3/D-position, 2-position or 1-position, the rear wall of the lock lever 31 is in abutment with the front wall of the stopper arm 10 thereby suppressing movement of the shift lever 8 from N-position to R-position.

That is, when, upon standstill of the vehicle, the shift lever 8 is moved to P-position, the lock lever 31 is projected into the case 1 thereby locking the shift lever 8 to achieve "Park-Lock" condition. Furthermore, when the vehicle is moving at a speed higher than a predetermined speed, unwilled movement of the shift lever 8 from 3/D-position, 2-position or 1-position to R-position through N-position is inhibited by the lock lever 31 that is in abutment with the front wall of the stopper arm 10. That is, "Neutral-Lock" condition is achieved in this case.

In the following, the above-mentioned "Park-Lock" and "Neutral-Lock" conditions will be described in detail with reference to FIGS. 3 and 5.

FIG. 3 shows "Park-Lock" condition of the shift lever device of the invention with the shift lever 8, as illustrated by a solid line, assuming P-position.

As is described hereinabove, under "Park-Lock" condition, the lock lever 31 (see FIG. 5) is projected into the window 49 and the rear wall of the stopper arm 10 is in abutment with the front wall of the lock lever 31. Thus, under this condition, counterclockwise rotation of the select member 5 about the axis of the shaft 4 is inhibited.

When, now, the shift lever 8 is applied with a certain force in a direction shown by the arrow D1 (see FIG. 3), that is, toward R-position, the abutment of the stopper arm 10 with the lock lever 31 inhibits movement of the shift lever 8 toward R-position. More specifically, if the force applied to the shift lever 8 is remarkable, the lock lever 30 is pressed against the rear wall 50 of the window 49 and thus appropriately received by the case 1.

When, under "Park-Lock" condition, an engine is started and a brake pedal is depressed or actuated, the electric actuator 35 is energized. Upon this, the work arm 42 of the actuator 35 is pulled down. With this, as is seen from FIG. 7, the shaft 34 and thus the lock lever 31 is pivoted away from the window 49 thereby to permit a rightward movement of the stopper arm 10 as viewed in the drawing. Thus, the shift lever 8 can be moved from P-position toward R-position along the gate slot 24. When the shift lever 8 is shifted to R-position, the vehicle can move backward and when the shift lever 8 is shifted to D-position, the vehicle can move forward.

When, now, the shift lever 8 is moved leftward with respect to the vehicle, that is, moved to 3-position, the associated transmission is brought to a third speed position. As is seen from FIG. 6, due to the leftward movement of the shift lever 8, the slider boss 16 of the shift lever 8 is moved leftward along the guide groove 9 of the select member 5.

It is thus to be noted that the shift lever 8 and the select member 5 move like a single unit when moved or pivoted forward and rearward about the axis of the shaft 4. That is, as is seen from FIG. 5, the shift lever 8 pivots rightward and leftward about the axis of the shaft 7 relative to the select member 5. Thus, if the indicator roof panel 23 (see FIG. 1) has an extra manual shift slot MS, the shift lever 8 in D-position can be pivoted rightward into the slot MS and pivoted forward and rearward isolating from the select member 5. By using the forward and rearward movement of the shift lever 8, a so-called manual shifting is obtainable by the shift lever device of the invention.

As is seen from FIG. 3, during the forward and rearward pivoting of the select member 5 about the axis of the shaft 4, the notched peripheral edge 12 of the sector arm 11 of the select member 5 is forced to slide on the rounded free end 14a of the spring plate 14 producing a detent feeling. Furthermore, as is seen from FIG. 4, when the shift lever 8 is pivoted laterally, that is, rightward and leftward in the drawing, the spring-biased slide pin 22 (see FIG. 5) is forced to slide laterally on the sloped bottom surface of the inclined groove 1a of the bracket 1b. This sliding produces a biasing force by which the shift lever 8 is biased to pivot leftward. In other words, such biasing force helps the driver to sense the necessity of pivoting the shift lever 8 rightward upon need of shift change.

When the vehicle moves at a speed higher than a predetermined speed, the electric actuator 35 is kept deenergized keeping the work arm 42 projected therefrom due to work of a biasing spring (not shown) installed in the actuator 35. Under this condition, as is seen from FIG. 7, the shaft 34 assumes a predetermined angular position causing the lock lever 31 to be placed in the window 49 of the case 1. Thus, as is described hereinabove, the pivotal movement of the stopper arm 10 in forward direction is suppressed. That is, under this condition, the rear wall of the lock lever 31 (see FIG. 5) abuts against the front wall of the stopper arm 10 thereby inhibiting the forward pivoting of the select member 5 and thus that of the shift lever 8. That is, "Neutral-Lock" that inhibits movement of shift lever 8 toward R-position is established. If, under this condition, an external force is applied to the shift lever 8 in a direction to move from N-position toward R-position, the stopper arm 10 presses the lock lever 31 against the front wall 51 of the window 49 of the case 1. This abutment brings about an assured inhibition of an undesirable shifting of the shift lever 8 toward R-position.

As is described hereinabove, when, under "Park-Lock" and/or "Neutral-Lock" condition, the lock lever 31 is projected into the window 49 of the case 1. Under this condition, the stopper arm 10 of the select member 5 abuts against the front wall of the lock lever 31 or the rear wall of the same. Thus, if, under this condition, the shift lever 8 is pulled or pushed by force, the lock lever 31 is moved but slightly until it firmly abuts against the rear or front wall 50 or 51 of the window 49. However, the slight movement of the lock lever 31 is appropriately absorbed by the axial movement of the shaft 34 which is axially movably held by the first and second shaft holders 38 and 36 (see FIG. 7).

As is described hereinabove, in accordance with the present invention, the shift lever 8 is movable or pivotal in two directions, one being a fore-and-aft direction and the other being a lateral direction with respect to the vehicle body. The fore-and-aft pivoting of the shift lever 8 is made together with the select member 5, and the lateral pivoting of the same is made independently relative to the select member 5. The pivotal movement of the select member 5 is restricted by the lock lever 31. Since, in stopping the movement of the select member 5, the lock lever 31 receives the force from the select member 5 at its one edge. If, under "Park-Lock" and/or "Neutral-Lock" condition, the shift lever 31.is accidentally pulled or pushed by force, the axial displacement of the lock lever 31 is stopped by the rear or front wall 50 or 51 of the window 49 of the case 1. In this condition, the lock lever 31 receives the force at one edge thereof while abutting against the rear or front wall 50 r 51 at the other edge thereof. That is, for stopping the select member 5, the lock lever 31 takes the most effective posture. Thus, unwilled or unexpected shifting of the shift lever 31 is reliably suppressed by the lock lever 31 that has a compact and thin structure.

The entire contents of Japanese Patent Application 2001-323452 filed Oct. 22m 2001 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A shift lever device comprising:
    a case adapted to be mounted on a vehicle, said case having a longitudinal axis and including an indicator roof panel that has a gate slot formed therethrough;
    a window formed in a side wall of said case, said window having opposed inner walls at front and rear positions of the window with respect to the longitudinal axis;
    a select member pivotally connected to said case in a manner to pivot about a first axis that extends substantially perpendicular to said longitudinal axis, said select member having a stopper arm moved therewith;
    a shift lever pivotally connected to said select member in a manner to pivot about a second axis that extends substantially in parallel with said longitudinal axis, said shift lever having a portion that passes through said gate slot;
    a lock lever pivotally connected to said case to be projectable into said window to block a traveling path of said stopper arm of the select member;
    an actuating mechanism that permits said lock lever to selectively assume a first position wherein said lock lever is projected into said window blocking the traveling path of said stopper arm and a second position wherein said lock lever is kept away from said window opening said traveling path; and
    a load supporting structure that causes said lock lever to move to and abut against either one of the opposed inner walls of said window when, with said lock lever assuming the first position, a given force is applied to said lock lever by the stopper arm of said select member.

2. A shift lever device as claimed in claim 1, in which said gate slot has a zigzag shape including first portions that extend substantially in parallel with said longitudinal axis and second portions that extend substantially perpendicular to said longitudinal axis.

3. A shift lever device as claimed in claim 1, in which said load supporting structure comprises:
    a shaft to which a base portion of said lock lever is integrally connected, said shaft being rotatably held by said case and axially movable in a direction substantially in parallel with said longitudinal axis.

4. A shift lever device as claimed in claim 3, in which said shaft of the lock lever is rotatably supported by:
    a first shaft holder connected to said case; and
    a second shaft holder connected to said case, said second shaft holder being clip-shaped and including two arms whose leading ends are separated by a certain distance for readily putting therein a portion of said shaft.

5. A shift lever device as claimed in claim 4, in which said shaft is formed with a thinner portion which is formed to facilitate the work for putting the shaft into said second shaft holder through a clearance defined between the two arms of the second shaft holder.

6. A shift lever device as claimed in claim 3, further comprising a stopper by which rotation of the shaft of the lock lever is restricted, said stopper including a projection provided on said shaft, which abuts against another projection provided by the case when rotation of the shaft about its axis exceeds a given degree.

7. A shift lever device as claimed in claim 3, in which said actuating mechanism comprises:
    an electric actuator having a projectable work arm;
    a pin fixed to said work arm;
    a lever radially projected from said shaft; and
    an elongate opening formed in said lever and having said pin pass therethrough.

8. A shift lever device as claimed in claim 7, in which said actuating mechanism further comprises:
    a cancel lever pivotally connected to said case;
    a cancel rod having a lower end contactable with one end of said cancel lever and an upper end exposed to an opening formed in said indicator roof panel;
    a cancel pin connected to the shaft of said lock lever, said cancel pin being offset with respect to an axis of said shaft, said cancel pin being pressed by the other end of said cancel lever in a direction to turn the lock lever away from said window when the end of said cancel lever is pressed down by said cancel rod; and
    a spring that biases the cancel lever in a direction to move the other end of said cancel lever from said cancel pin.

9. A shift lever device as claimed in claim 7, in which when said shift lever is pivoted to either one of P-position and N-position, said electric actuator is deenergized to cause the shaft to turn in a direction to cause the lock lever to project into the window to block the traveling path of the stopper arm.

10. A shift lever device as claimed in claim 1, in which said window is formed in a side wall of said case and framed.

11. A shift lever device as claimed in claim 10, in which said lock lever is in a generally sectoral form and has one major surface facing one of the opposed inner walls of the window and the other major surface facing the other of the opposed inner walls.

12. A shift lever device as claimed in claim 1, in which said select member is formed with a guide groove with which a slider boss formed on said shift lever is slidably engaged permitting the pivotal movement of the shift lever relative to the select member.

13. A shift lever device as claimed in claim 12, further comprising a detent feeling producing mechanism by which a detect feeling is produced when the shift lever is operated, said detent feeling producing mechanism including:

a sector arm provided by said select member, said sector arm having a notched peripheral edge; and a spring plate connected to said case, said spring plate having a rounded free end resiliently pressed against the notched peripheral edge of said sector arm.

14. A shift lever device as claimed in claim 13, further comprising a biasing structure by which the shift lever is biased to pivot in a given direction relative to said select member, said biasing structure comprising:

an inclined groove defined on a lower surface of a bracket that is fixed to the case; and a spring-biased slide pin held by said shift lever and pressed against a bottom surface of said inclined groove.

15. A shift lever device as claimed in claim 1, in which said case, said select member, said shift lever and said lock lever are constructed of a reinforced plastic.

* * * * *